Jan. 14, 1964     J. F. PAULSEN     3,117,467
DYNAMIC DAMPERS
Filed July 14, 1960
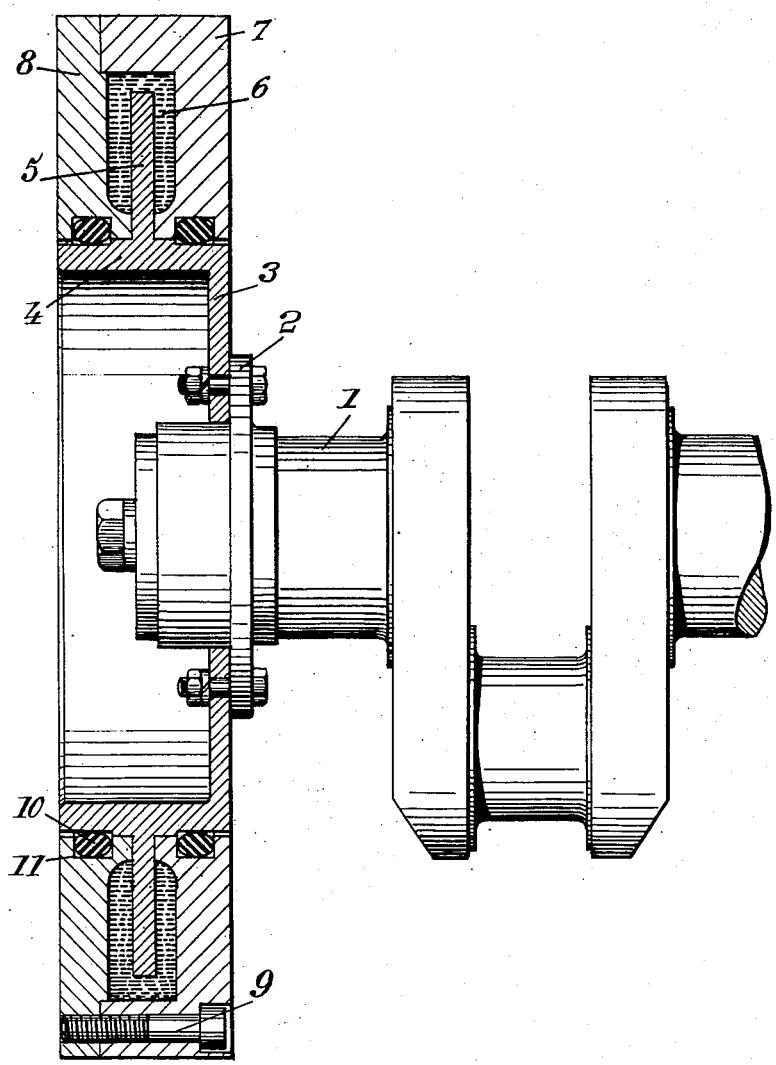
INVENTOR
Jean Felix Paulsen
BY
Lawson and Taylor
ATTORNEY

United States Patent Office 3,117,467
Patented Jan. 14, 1964

3,117,467
DYNAMIC DAMPERS
Jean Félix Paulsen, Paris, France, assignor to Societe Luxembourgeoise de Brevets et de Participations, Luxembourg, a society of Luxembourg
Filed July 14, 1960, Ser. No. 42,863
Claims priority, application France July 22, 1959
8 Claims. (Cl. 74—574)

The present invention relates to devices for damping the torsional vibrations of rotating masses and consisting essentially of an auxiliary mass mounted on the main rotating mass to be damped by means of a connection permitting relative rotational displacements of said masses and having given resilient and/or damping characteristics, and the invention is concerned particularly but not exclusively with devices for damping the torsional-vibrations of crankshafts.

The main object of the present invention is to provide an improved damper which meets the various requirements of practice better than was hitherto possible, and in particular of simpler, sturdier and lighter construction for a given damping efficiency.

According to the present invention, the two above mentioned masses having adjacent respective walls which enclose between them a closed annular space, the smallest dimension of at least one portion of said space measures more than 1 mm., and said space is filled with a sticky elastomer material such for instance as a mixture of polyisobutylenes of low molecular weight with other polyisobutylenes of high molecular weight.

A resilient dynamic damper may be designed so that its own oscillation frequency corresponds to the frequency of the torsional vibrations to be damped: on a weight-for-weight basis, an elastic damper tuned in this way will be much more efficient than an untuned resilient damper or a non-resilient or rigid damper.

The French Patent No. 1,187,781 of July 22, 1957 described a resilient damper of this kind in which the main rotating mass and the auxiliary mass had respective co-operating walls adjacent to each other and enclosing between them a very narrow annular space having a width of a fraction of a millimeter and filled with a viscous substance adhering to the walls, whereby the shearing deformation of the viscous film existing between the walls provided for almost the whole of the damping action of the damper, the remainder of this damping action and the resiliency of the damper being produced by deformations of rubber rings adhering firmly both to the main mass and to the auxiliary mass and constituting sealing elements for the viscous substance filling the space between the walls.

The present invention is based upon the discovery that, when the thickness of the viscous film contained in such a damper is increased, the properties of resiliency of this film are substantially higher than those which could be expected from the mere deformation of rubber rings. The thickness of the viscous layer must have a value of more than 1 mm. (for example, between 1.5 and 5 mm.) and the adhering rubber rings can then be omitted and replaced by mere sealing joints, preferably of toroidal shape.

It was found that under these conditions the viscous substance gave the damper a good resiliency whilst ensuring the desired damping action, which makes it possible to tune the damper without incorporating rubber rings therein.

In comparison with the dampers which make use of the resilient properties of rubber rings, the dampers according to the present invention have the following important advantage: In a ring-type damper, the rings are chemically glued to the main and auxiliary masses to be joined; the excessive jerks during the rotational movements of the mass to be damped therefore produce tears in these rings, which may place the damper out of action. On the contrary, in a damper according to my invention, these jerks can only cause intermolecular slipping within the viscous substance, with a return to the initial characteristics as soon as the relative displacement velocities between the facing rigid walls have again become normal.

The viscous material must have good resilient and plastic properties analogous to those of raw rubber, as well as good contact adhesion to rigid bodies and in particular mainly to metals (sticking property).

Advantageously this material consists of polyisobutylene of a molecular weight of about 12,000 or of a mixture of polyisobutylenes some of which, forming from 25 to 50 percent by weight of the mixture, are of low molecular weight (ranging from 5,000 to 10,000) and are strongly adhesive and sticky whereas the others are of high molecular weight (for instance averaging 80,000 or even higher) and have resiliency and plasticity characteristics analogous to those of raw rubber.

If use is made of such a mixture, the polyisobutylene of high molecular weight may be replaced by raw butyl rubber, which consists of 98% of polyisobutylene having a molecular weight of 80,000 and of a small amount of polyisoprene.

The viscous material may also consist of a mixture of an elastomer or of raw rubber with a substance capable of improving its adhesive power, the proportion by weight of this substance ranging preferably from 25 to 30%. When raw rubber is used, said substance may be colophony or a hydrogenated derivative thereof (such as the resin designated by the name Staybelite), a coumarone-indene resin, nitrocellulose and the like. When use is made of an artificial elastomer, such as butadiene-styrene, known as SBR, or nitril rubber, known as NBR, said substance may also consist of a terpenephenol, phenol or formophenol resin.

An embodiment of my invention will now be described, by way of example, with reference to the accompanying drawing which shows, in axial cross section, a damper mounted on a crankshaft of an internal combustion engine.

The end of the crankshaft 1 carries a flange or collar 2, to which is fixed, by means of bolts, a rotating unit 3, so that the assembly of these elements 1, 2 and 3 constitutes the rotating mass the torsional vibration of which is to be damped.

Unit 3 includes a cylindrical sleeve or rim 4 carrying, integral therewith, a transverse flat annular disc 5.

Around unit 3, there is provided a hollow flywheel or annular auxiliary mass extending on both sides of disc 5 so as to form by the inner walls therewith an annular space 6 having an axial cross section in the shape of the letter U, the base and sides of which have thicknesses of more than 1 mm. (for instance 2 mm.).

Said flywheel or annular auxiliary mass consists of two parts, namely a box-like portion 7 and a cover 8, which are assembled by means of screws 9 so as to form a tight joint between them.

The flywheel is slidably mounted or journalled with a sliding fit on member 3. It bears in the longitudinal direction against the root portion of disc 5 and in the radial direction against the outer cylindrical surface of casing 4.

A viscous material, such as described above, fills the annular space 6 and two toroidal sealing joints 10 are fitted in recesses 11 of the flywheel and/or of casing 4 on both sides of the disc 5, thereby preventing outflow of the viscous material.

In a general manner, while I have, in the above description, disclosed what I deem to be a practical and efficient embodiment of my invention, it should be well understood that I do not wish to be limited thereto as there might be changes made in the arrangement, disposition and form of the parts without departing from the principle of the present invention as comprehended within the scope of the accompanying claims.

What I claim is:

1. A device for damping vibrations of a main mass rotating about an axis comprising, in combination, a cylindrical rim of revolution about said axis and rigid with said mass for rotation therewith, a flange-like annular disc integral with said rim at a root portion of the disc and extending outwardly from the rim in a plane perpendicular to said axis, a hollow annular flywheel journalled with a sliding fit on the cylindrical rim and surrounding the annular disc so as to be slidable with respect to the rim and the root portion of the disc, the hollow annular flywheel surrounding the annular disc such that the inner walls of the hollow portion of the flywheel are at a distance ranging from 1 to 5 millimeters from the annular disc outward of the root portion, a sticky elastomer material filling the space between disc and inner walls of the flywheel, and sealing means between the rim and the flywheel at the journal to prevent outflow of the sticky elastomer material.

2. A device as claimed in claim 1 in which the axial cross-section of the space formed by the inner walls has the shape of a U.

3. A device as claimed in claim 1, in which said sealing means are toroidal joints.

4. A device according to claim 1 in which said sticky elastomer material consists of polyisobutylene of a molecular weight of at least approximately 12,000.

5. A device according to claim 1 in which said sticky elastomer material consists of a mixture containing from 25 to 50 percent of polyisobutylenes of molecular weights ranging from 5,000 to 10,000 and the remainder polyisobutylene of a molecular weight at least equal to 80,000.

6. A device according to claim 1 in which said sticky elastomer material consists of a mixture of caoutchouc and an adhesive substance.

7. A device according to claim 1 in which said sticky elastomer material consists of a mixture of an artificial elastomer and an adhesive substance.

8. A device according to claim 7 in which said adhesive substance is colophony.

References Cited in the file of this patent

UNITED STATES PATENTS

| | | |
|---|---|---|
| 1,257,052 | Tibbetts | Feb. 19, 1918 |
| 2,473,335 | Hardy | June 14, 1949 |
| 2,838,955 | Burch | June 17, 1958 |
| 2,898,777 | Boehm | Aug. 11, 1959 |
| 2,926,546 | Paulsen | Mar. 1, 1960 |
| 2,932,987 | Foster | Apr. 19, 1960 |
| 2,939,338 | Troyer | June 7, 1960 |